United States Patent
King et al.

(10) Patent No.: US 12,528,161 B2
(45) Date of Patent: Jan. 20, 2026

(54) SYSTEM AND METHOD FOR MEASURING TORQUE AND ANGLE

(71) Applicant: Snap-on Incorporated, Kenosha, WI (US)

(72) Inventors: Jerry A. King, Hacienda Heights, CA (US); Nathan J. Lee, Escondido, CA (US); John L. Reynertson, Geneva, IL (US); Stephen M. Bauer, Aurora, IL (US); Jie Li, Rancho Santa Margarita, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/213,348

(22) Filed: Jun. 23, 2023

(65) Prior Publication Data

US 2023/0347481 A1    Nov. 2, 2023

Related U.S. Application Data

(63) Continuation of application No. 16/374,384, filed on Apr. 3, 2019, now Pat. No. 11,752,604.

(Continued)

(51) Int. Cl.
*B25B 23/142* (2006.01)
*B25B 23/147* (2006.01)
*B60B 29/00* (2006.01)

(52) U.S. Cl.
CPC ...... *B25B 23/1425* (2013.01); *B25B 23/1475* (2013.01); *B60B 29/006* (2013.01);

(Continued)

(58) Field of Classification Search
CPC ............ B25B 23/1425; B25B 23/1475; B25B 23/147; B60B 29/006; B60B 2900/113;

(Continued)

(56) References Cited

U.S. PATENT DOCUMENTS 3,939,920 A    2/1976   Hardiman et al.
4,104,778 A    8/1978   Miet (Continued)

FOREIGN PATENT DOCUMENTS

CA        2998002      11/2018
CN     102126194 A      7/2011

(Continued)

OTHER PUBLICATIONS

United Kingdom Office Action for Application No. GB1905010.3 dated Sep. 12, 2019, 7 pages.

(Continued)

*Primary Examiner* — Thomas M Wittenschlaeger
*Assistant Examiner* — Katie L Gerth
(74) *Attorney, Agent, or Firm* — Taft, Stettinius & Hollister LLP

(57) ABSTRACT

The present invention relates to torque application tools, such as an electronic torque screwdriver, with a multiple axis gyroscope (such as a 3-axis gyroscope or other type of gyroscope) and torque sensor that allows for simultaneous or sequential measurement of torque and angle around the axis of the tool. Targets for torque and angle measurements may be used to create algorithms to detect breakaway torque, residual torque, or to perform error proofing to ensure unique fasteners are tightened.

11 Claims, 5 Drawing Sheets

Related U.S. Application Data

(60) Provisional application No. 62/657,359, filed on Apr. 13, 2018.

(52) U.S. Cl.
CPC ....... *B25B 23/147* (2013.01); *B60B 2900/113* (2013.01); *B60B 2900/212* (2013.01); *B60B 2900/3315* (2013.01)

(58) Field of Classification Search
CPC ...... B60B 2900/212; B60B 2900/3315; G01D 21/02
See application file for complete search history.

(56) References Cited

U.S. PATENT DOCUMENTS

| | | | |
|---|---|---|---|
| 4,305,471 A | 12/1981 | Eshghy | |
| RE31,569 E * | 5/1984 | Eshghy | B25B 23/1456 |
| | | | 173/183 |
| 4,689,534 A | 8/1987 | Gerber et al. | |
| 5,212,862 A * | 5/1993 | Eshghy | B25B 23/147 |
| | | | 29/407.03 |
| 5,284,217 A | 2/1994 | Eshghy | |
| 5,476,014 A | 12/1995 | Lampe et al. | |
| 5,589,644 A | 12/1996 | Becker et al. | |
| 5,637,968 A | 6/1997 | Kainec et al. | |
| 5,903,462 A | 5/1999 | Wagner et al. | |
| 6,161,629 A | 12/2000 | Hohmann et al. | |
| 6,167,788 B1 | 1/2001 | Schonberger et al. | |
| 6,516,896 B1 | 2/2003 | Bookshar et al. | |
| 6,698,298 B2 | 3/2004 | Tsuji et al. | |
| 6,965,835 B2 * | 11/2005 | McGee | B25B 23/14 |
| | | | 702/41 |
| 7,062,979 B2 | 6/2006 | Day et al. | |
| 7,082,866 B2 | 8/2006 | Becker | |
| 7,121,358 B2 | 10/2006 | Gass et al. | |
| 7,565,844 B2 * | 7/2009 | Crass | B25B 23/1425 |
| | | | 73/862.21 |
| 7,721,631 B2 | 5/2010 | Berg et al. | |
| 7,841,100 B2 | 11/2010 | Lucke | |
| 7,934,428 B2 | 5/2011 | Schultz et al. | |
| 8,171,828 B2 | 5/2012 | Duvan et al. | |
| 8,264,374 B2 * | 9/2012 | Obatake | B25B 23/0078 |
| | | | 701/41 |
| 8,316,958 B2 | 11/2012 | Schell et al. | |
| 8,485,273 B2 | 7/2013 | Elsmark et al. | |
| RE45,112 E | 9/2014 | Zhang et al. | |
| 9,022,135 B2 | 5/2015 | Khalaf et al. | |
| 9,085,072 B2 | 7/2015 | Anjanappa et al. | |
| 9,281,770 B2 | 3/2016 | Wood et al. | |
| 9,320,558 B2 | 4/2016 | Cattaneo | |
| 9,475,180 B2 | 10/2016 | Eshleman et al. | |
| 9,743,971 B2 | 8/2017 | Belkoff et al. | |
| 9,770,816 B2 | 9/2017 | Yokoyama et al. | |
| 10,272,550 B2 * | 4/2019 | Dey, IV | B25B 21/026 |
| 10,585,405 B2 * | 3/2020 | Li | G05B 19/182 |
| 10,792,795 B2 * | 10/2020 | Lee | B25B 23/14 |
| 2005/0092143 A1 | 5/2005 | Lehnert et al. | |
| 2009/0078057 A1 * | 3/2009 | Schultz | B25B 23/1425 |
| | | | 73/862.23 |
| 2009/0139738 A1 | 6/2009 | Lippek | |
| 2010/0265097 A1 * | 10/2010 | Obatake | B25F 5/00 |
| | | | 340/870.4 |
| 2011/0162493 A1 * | 7/2011 | Anjanappa | B25B 23/1427 |
| | | | 81/479 |
| 2012/0006161 A1 * | 1/2012 | Chen | G01L 5/24 |
| | | | 81/479 |
| 2012/0132043 A1 | 5/2012 | Chen et al. | |
| 2013/0211413 A1 * | 8/2013 | Cattaneo | A61B 17/8875 |
| | | | 606/104 |
| 2014/0331830 A1 * | 11/2014 | King | G01L 5/24 |
| | | | 81/467 |
| 2014/0336810 A1 * | 11/2014 | Li | G05B 15/02 |
| | | | 700/103 |
| 2015/0021062 A1 * | 1/2015 | Sekino | B25B 23/14 |
| | | | 173/183 |
| 2015/0201918 A1 | 7/2015 | Kumar et al. | |
| 2016/0089734 A1 | 3/2016 | Eshleman et al. | |
| 2017/0007328 A1 | 1/2017 | Cattin et al. | |
| 2017/0348037 A1 | 12/2017 | Sexson et al. | |
| 2018/0045595 A1 * | 2/2018 | Kleza | F04D 29/042 |
| 2018/0333831 A1 * | 11/2018 | Lee | G01L 25/003 |
| 2020/0201809 A1 * | 6/2020 | Li | B25B 23/1425 |
| 2023/0112334 A1 * | 4/2023 | Zhang | A61B 90/06 |
| | | | 606/1 |

FOREIGN PATENT DOCUMENTS

| | | |
|---|---|---|
| CN | 103934673 B | 7/2014 |
| CN | 104139365 A | 11/2014 |
| CN | 104708298 A | 6/2015 |
| CN | 104816271 A | 8/2015 |
| CN | 102179791 | 8/2016 |
| CN | 206216578 U | 6/2017 |
| CN | 108107933 A | 6/2018 |
| DE | 4243317 A1 | 6/1993 |
| DE | 102006044774 A1 | 4/2008 |
| EP | 2248632 A1 | 11/2010 |
| EP | 3025823 A1 | 6/2016 |
| GB | 2102152 | 1/1983 |
| GB | 2283112 A | 4/1995 |
| GB | 2467581 | 8/2010 |
| GB | 2514487 | 11/2014 |
| GB | 2562838 | 11/2018 |
| IN | 102834225 A | 12/2012 |
| IN | 107530870 A | 1/2018 |
| JP | S5749828 A | 3/1982 |
| TW | 201512794 | 4/2015 |
| TW | 1495274 | 8/2015 |
| TW | 201729027 | 8/2017 |
| WO | 2007062229 | 5/2007 |
| WO | 2009039497 | 3/2009 |
| WO | 2012017295 | 2/2012 |

OTHER PUBLICATIONS

Taiwan Office Action for Application No. 108112910 dated Oct. 23, 2019, 9 pages.
Taiwan Office Action for Application No. 10920167270 dated Feb. 24, 2020, 6 pages.
Canadian Office Action for Application No. 3,039,873 dated Apr. 20, 2020, 3 pages.
Examination Report No. 1 for Application No. 2019202499 dated Mar. 30, 2020, 4 pages.
United Kingdom Examination Report for Application No. GB1905010.3 dated Jun. 4, 2020, 6 pages.
Taiwan Office Action for Application No. 108112910 dated Jun. 29, 2020, 6 pages.
Chinese Office Action for Application No. 20190295587.6 dated Aug. 6, 2020, 8 pages.
Examination Report for Application No. GB1905010.3 dated Oct. 26, 2020, 3 pages.
Examination Report No. 2 for Application No. 2019202499 dated Dec. 14, 2020, 5 pages.
Examination Report No. 3 for Application No. 2019202499 dated Mar. 12, 2021, 4 pages.
Chinese Office Action for Application No. 201910295587.6 dated Mar. 9, 2021, 3 pages.
Taiwan Office Action for Application No. 11020078670 dated Jan. 28, 2021, 6 pages.
Combined Search and Examination Report for Application No. GB2012045.7 dated Jan. 12, 2021, 6 pages.
Chinese Office Action for corresponding Application No. 201910295587.6 dated Aug. 20, 2021, 7 pages.
Examination Report No. 1 for corresponding Application No. 2021201994 dated Mar. 4, 2022, 4 pages.
Examination Report No. 2 for corresponding Application No. 2021201994 dated Oct. 19, 2022, 4 pages.

(56) References Cited

OTHER PUBLICATIONS

Australian Patent Office, Examination Report No. 1 issued in corresponding Application No. 2023201362, dated Apr. 24, 2024, 5 pp.

* cited by examiner

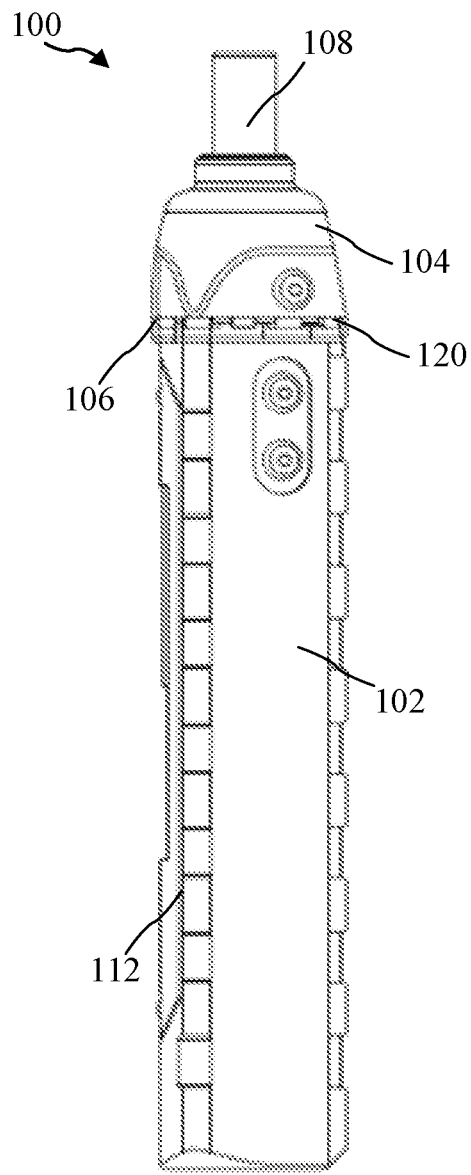
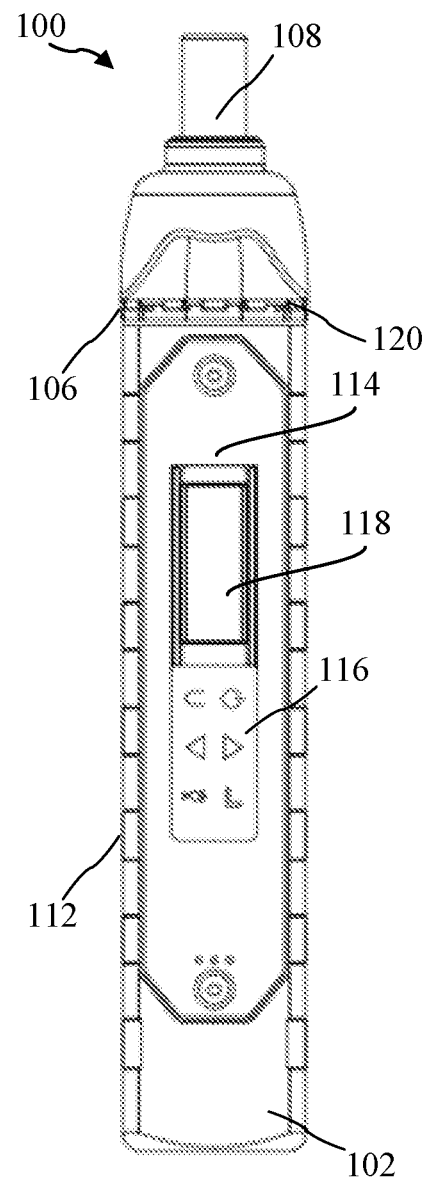
*FIG. 2*          *FIG. 3*

SYSTEM AND METHOD FOR MEASURING TORQUE AND ANGLE

CROSS REFERENCE TO RELATED APPLICATIONS

The present application is a continuation of and claims priority to U.S. application Ser. No. 16/374,384, filed on Apr. 3, 2019, which claims priority to U.S. Provisional Application No. 62/657,359, filed on Apr. 13, 2018, the contents of which are incorporated by reference herein in their entirety.

TECHNICAL FIELD OF THE INVENTION

The present invention relates generally to tools adapted to apply torque to a work piece. More particularly, the present invention relates to torque application tools with a multi-axis gyroscope and torque sensor.

BACKGROUND OF THE INVENTION

Torque application tools are commonly used in automotive and industrial applications to apply a desired amount of torque to a work piece, such as a threaded fastener or bolt. For example, a torque application procedure may require tightening a work piece to a desired amount of torque or within a desired torque range. Securing the work piece at a desired torque amount allows for secure attachment of the components and structures related thereto, without the risks of under-tightening or over-tightening the work piece. For example, not apply the proper amount of torque could result in under tightening the work piece, which could result in unintended disengagement of the components. Likewise, applying too much torque could over-tighten the work piece which could cause disengaging the work piece difficult, or could otherwise damage the fastened components or work pieces. To prevent under-tightening or over-tightening, a torque measurement can be made while tightening the components, for example, bolts or nuts, to meet a target torque amount or to apply an amount of torque within a desired torque range.

SUMMARY OF THE INVENTION

The present invention relates broadly to torque application tools, such as an electronic torque screwdriver, with a multiple axis gyroscope (such as a 3-axis gyroscope or other type of gyroscope) and torque sensor that allows for simultaneous or sequential measurement of torque and angle around the axis of the tool. Targets for torque and angle measurements may be used to create algorithms to detect breakaway torque, residual torque, or to perform error proofing to ensure unique fasteners are tightened.

In an embodiment, a tool having a handle and a drive is disclosed. The tool may include a control housing extending from the drive and a controller disposed in the control housing. The controller may include a torque sensor configured to measure amounts of torque applied by the drive to a work piece, and a gyroscope configured to measure amounts of angular rotation of the drive. The controller may also include a processor and a memory. The processer may be configured to determine an angular position of the drive from the gyroscope. The tool may further include an input interface in communication with the controller and a display in communication with the controller and configured to display a value.

In another embodiment, a method of applying torque to a work piece by a tool is disclosed. The tool may have a drive, a controller, a torque sensor, a gyroscope, a memory, an input interface, and a display. The tool may receive a minimum desired torque value and a maximum desired torque value via the input interface. A minimum desired rotational angle value and a maximum desired torque value may also be received via the input interface. Respective measurements of amounts of torque respectively applied to work pieces may be received from the torque sensor, such that when the amount of torque applied to the work piece reaches the minimum torque value, a rotational angle measurement is received. The amount of torque and the rotational angle may be measured until the amount of torque reaches the maximum torque value. A measured rotation angle may be compared to the minimum rotational angle.

In yet another embodiment, a method of measuring the amount of torque applied by a tool to a work piece is disclosed. A minimum desired torque value and a maximum desired torque value may be received via an input interface. A minimum desired rotational angle value and a maximum desired rotational angle value may also be received via an input interface. Respective measurements of amounts of torque respectively applied to work pieces may be received from the torque sensor, and rotational angle measurements may be determined from rotational measurements received from a gyroscope. The respective amounts of torque applied to the work piece and the respective rotational angle measurements may be recorded in a memory until a target value is reached. The target value may include at least one of the minimum torque value, the maximum torque value, the minimum rotational angle value, and the maximum rotational angle value. Further, an indication may be activated upon reaching the target value.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

FIGS. 2 and 3 are first and second side views of the torque application tool of FIG. 1, according to an embodiment of the present invention.

DETAILED DESCRIPTION

Figure 1:
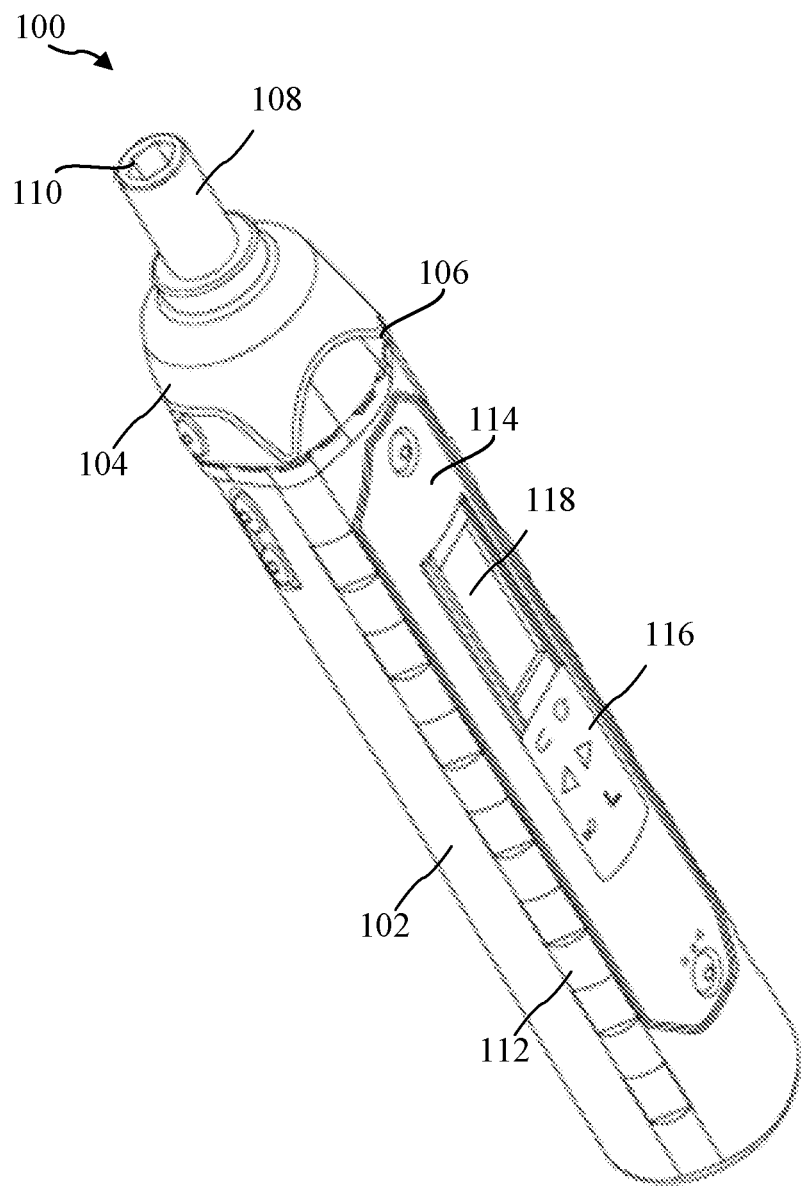
FIG. 1 is a perspective view of a torque application tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to torque application tools, such as an electronic torque screwdriver, with a multiple axis gyroscope (such as a 3-axis gyroscope or other type of gyroscope) and a torque sensor that allows for simultaneous or sequential measurement of torque and angle around the axis of the tool. Targets for torque and angle measurements may be used to create algorithms to detect breakaway torque, residual torque, or to perform error proofing to ensure fasteners are tightened.

For example, a torqueing operation may include applying a minimum target torque amount to a work piece or fastener. A work piece that does not rotate a minimum angle amount can be an indication that the work piece has already been tightened or may be cross-threaded. It can also be an indication that the amount of the applied torque was not enough to overcome fastener friction and has not obtained the proper torque. A work piece that has exceeded a maximum angle can be an indication of a fastener that is yielding due to stressing, plastic deformation, or mechanical failure, such as stripped threads.

A method and system are also disclosed for combining torque measurement with a gyroscope for measuring rotational angle in the tool. For example, a target torque amount may be applied to a work piece while simultaneously monitoring a rotational angle amount. Further, measuring and compensating for prevailing torque for locking-type work pieces and measuring breakaway and residual torque of pre-tightened work piece is provided.

Referring to FIGS. 1-3 a torque application tool 100, such as a screwdriver, is illustrated. It will be understood that a screwdriver tool is being shown for exemplification purposes only, and the present invention is not limited to screwdriver tools, and is rather broadly applicable to any type of torque application tool. The tool 100 includes a body portion 102 (also referred to as a body 102), a head portion 104 (also referred to as a head 104) coupled to the body 102, an illuminating indicator 106 disposed between the head 104 and the body 102, and a drive 108 extending from the head 104. The tool 100 is adapted to apply torque to a work piece, such as a fastener, via an adapter, bit (such as a flathead, Philips, Torx, allen, or other type of bit), or socket coupled to the drive 108, such as a bi-directional ratcheting square or hexagonal drive, that is adapted to engage a work piece. As illustrated, the drive 108 is a "female" connector 110 designed to receive a male counterpart. However, the drive 108 may be a "male" connector designed to fit into or penetrate a female counterpart. The drive may also be structured to engage directly a work piece without coupling to an adapter, bit, or socket.

The body 102 may also function as a handle, and be gripped by a user to apply torque to the work piece. Accordingly, the body 102 may include a textured grip 112 to improve a user's grasp of the tool 100 during torqueing operations. Although the grip 112 is illustrated as being located along a length of the body 102, the grip 112 may be positioned at other locations about the body 102. The body 102 may also house a control unit 114 of the tool 100. The control unit 114 may include a user interface, such as a user interface comprising at least one button 116 and a display screen 118. The user interface may be used by a user for inputting instructions, modifying settings of the tool 100 or interacting with menus presented on the display screen 118. For example, the user input interface may be configured to allow a user to input information, data, and/or commands into the tool 100. By way of example, the user input interface can include a keyboard, mouse, touch screen, audio recorder, audio transmitter, member pad, or other device that allows for the entry of information from a user. As exemplarily shown in FIG. 1, in an embodiment, the user input interface can include buttons 116, e.g., power, up/down control buttons, an "enter" key, a "units" key and other buttons. In one example, the buttons allow the user to input a torque setting.

The display screen 118 can display various information for the user to view and interpret, for example, text or graphics, or information entered into the user input interface. By way of example, the display screen 118 can include a liquid crystal display (LCD), organic light emitting diode (OLED) display, plasma screen, or other kind of black and white or color display that allows the user to view and interpret information. The display screen 118 may optionally be touch-sensitive, with software or firmware executed by a processor or controller of the control unit 114 providing virtual on-screen controls. Instructions and other information can be input directly into the tool 100 via the user interface. During torqueing operation or use of the tool, the display 118 may display information, such as torque and/or angle information.

As will be discussed below, the body 102 and/or head 104 may also house one or more sensors used to measure the amount of torque applied to a work piece via the drive 108 and the amount of angle of rotation applied to the work piece via the drive 108. The tool 100 may also include an orientation sensor to determine the angle of a longitudinal axis of the body 102 relative to "down" (that is, relative to the force of gravity).

As will be described below, the tool 100 can measure, record, and display torque and angle data in real time during torqueing operations, as well as transmit that data in real time to an external device (such as, an external computing device, mobile device, etc.). In the context of the present application, "real time" means "without significant delay" (e.g., measurement and processing delays not exceeding one second per data sample). Torque application and angle data may be logged and stored with a time index by the tool 100 and/or a software application on the external device.

The illuminating indicator 106 may include one or more illuminating indicators 120, such as light emitting diodes (LEDs). In an embodiment, the LEDs are multiple color LEDs. The indicators 120 are equally spaced 360 degrees around a longitudinal axis of the tool 100, and between the head 104 and the body 102. This allows one or more of the indicators 120 to be visible to the user during a torqueing operation. For example, during a torqueing operation, the user may grasp the body 102, and the user's hand may obstruct the display screen 118. However, the illuminating indicator 106 remains unobstructed by the user's hand since the illuminating indicator 106 is proximal to the head 104 between the head 104 and the body 102. In some embodiments, the illuminating indicator 106 may be angled or oriented to face in a direction towards a rear of the body 102 (i.e., away from the drive 108), and thereby towards the user.

In an example, the indicators 120 may be multiple color LEDs. In this respect, the indicators 120 may include first indicators adapted to illuminate yellow, second indicators adapted to illuminate green, and third indicators adapted to illuminate red, for example. It will be appreciated that different color indicators may also be used.

The different colored first, second, and third indicators are used to indicate to the user that the amount of applied torque and/or angular rotation is approaching a target torque and/or angle value, the target torque and/or angle value has been reached, and when an upper limit of the target torque and/or angle value has been exceeded. As described above, the illuminating indicator 106 (including the indicators 120) are proximal to a head 104 of the tool 100 so the indicators 120 are not obstructed by the user's hand when using the tool 100. The indicators 120 are also placed in a ring pattern allowing 360 degrees of viewing during rotation and/or use of the tool 100.

The indicators 120 indicate amounts of applied torque and/or angle as a percentage of the target torque and/or angle values. For example, the first indicators are used to indicate increasing amounts of applied torque and/or angle. The second indicators are used to indicate when the amount of applied torque and/or angle reaches the target torque and/or angle values. The third indicators are used to indicate when the amount of applied torque and/or angle reaches an over-limit torque and/or angle value.

Other means of indicating a progress toward a target torque and/or angle can be implemented without departing from the spirit and scope of the present application. For example, audible indications can be activated (using the speaker/transduce 122 illustrated in FIG. 4), and/or tactile indications can be activated (using the haptic vibrator 124 illustrated in FIG. 4).

Figure 4:
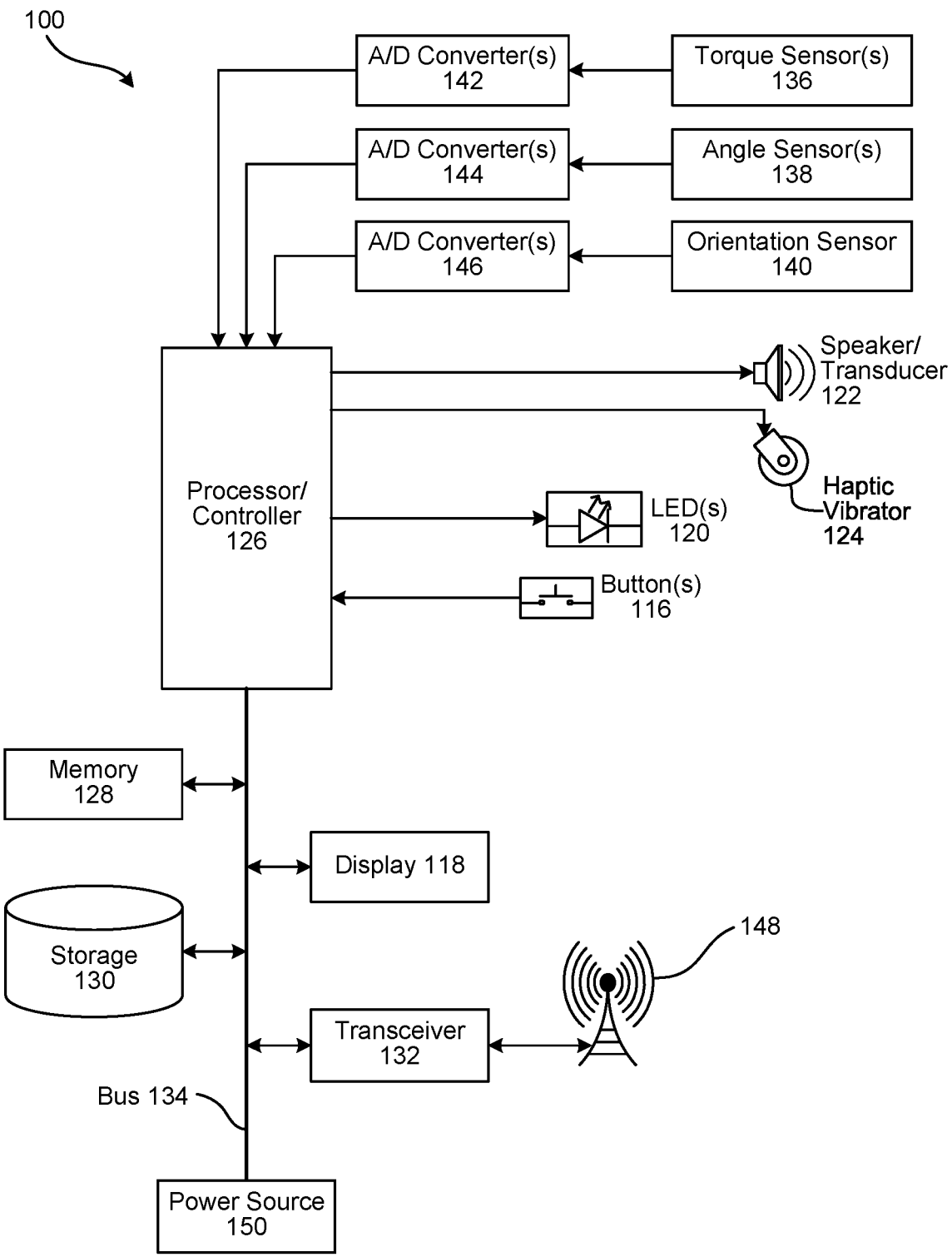
FIG. 4 is an exemplary block diagram conceptually illustrating example components of the torque application tool of FIG. 1, according to an embodiment of the present invention.

FIG. 4 is an exemplary block diagram conceptually illustrating example components of the tool 100. The tool 100 may include one or more controllers/processors 126, a memory 128, non-volatile storage 130, and a wireless communications transceiver 132. Each controller/processor 126 may include a central processing unit (CPU) for processing data and computer-readable instructions. The processor/controller 126 retrieves instructions from data storage 130 via a bus 134, using the memory 128 for runtime temporary storage of instructions and data. The memory 128 may include volatile and/or nonvolatile random access memory (RAM). While components are illustrated in FIG. 4 as being connected via the bus 134, components may also be connected to other components in addition to (or instead of) being connected to other components via the bus 134.

Data storage 130 stores the instructions, including instructions to perform the operations of the tool 100 described herein. The data storage component 130 may include one or more types of non-volatile solid-state storage, such as flash memory, read-only memory (ROM), magnetoresistive RAM (MRAM), phase-change memory, etc. The tool 100 may also include an input/output interface to connect to removable or external non-volatile memory and/or storage (such as a removable memory card, memory key drive, networked storage, etc.). Such an input/output interface may be a wired or embedded interface (not illustrated) and/or may comprise the wireless communications transceiver 132.

Computer instructions for operating the tool 100 and its various components may be executed by the controller/processor 126, using the memory 128 as temporary "working" storage at runtime. The computer instructions may be stored in a non-transitory manner in non-volatile memory 128, storage 130, or an external device. Alternatively, some-or-all of the executable instructions may be embedded in hardware or firmware in addition to or instead of software.

The tool 100 may include multiple input and output interfaces. These interfaces include the radio transceiver 132, one-or-more buttons 116, one-or-more light-emitting diodes LEDs 120, a speaker or audio transducer 122, a haptics vibrator 124, one-or-more torque sensors 136, one-or-more angle sensors 138, and an orientation sensor 140. The torque sensor 136 may include, for example, one-or-more of a torque transducer, a strain gauge, a magnetoelastic torque sensor, and a surface acoustic wave (SAW) sensor. The angle sensors 138, or other such device, may be configured to measure a rate of rotation of the drive 108, or a drive shaft coupled thereto, about an axis while the drive 108 is turning. Upon the detection of torque by the torque sensor 136 in a driving operation, the rate of rotation may be integrated over time to determine the angle of rotation. The angle sensors 138 may comprise, for example, one-or-more of a rotational angle sensor, electronic gyroscope (such as a two-or-three axes gyroscope), accelerometer, and the like. In the case of an accelerometer, the angular position may be found by double integrating the rotational acceleration. The orientation sensor 140 may comprise a three-axis electronic accelerometer or gravity sensor to determine the orientation of the longitudinal axis of the tool 100 relative to "down."

Depending on the type of torque sensor 136 used, analog-to-digital (A/D) converters 142 may receive analog signals from the torque sensor 136, outputting digital signals to the processor/controller 126. Likewise, A/D converters 144 may receive analog signals from the angle sensor 138, and A/D converters 146 may receive analog signals from the orientation sensor 140, outputting digital signals to the processor/controller 126. The A/D converters 142/144/146 may be discrete, integrated with/in the processor/controller 118, or integrated with/in their respective sensors 136/138/140.

The number of, and need for, the A/D converters 142/144/146 is dependent on the technology used for each sensor 136/138/140. Multiple A/D converters may be provided to accommodate as many signals as needed, such as if the angle sensor 138 provides analog outputs for a plurality of gyroscope axes, or if the orientation sensor 140 provides analog outputs for a plurality of accelerometer axes. Signal conditioning electronics (not illustrated) may also be included as standalone circuitry, integrated with/in the processor/controller 126, or integrated with/in the respective sensors 136/138/140, to convert non-linear outputs generated by a component of a sensor 136/138/140 into a linear signal.

Instructions executed by the processor/controller 126 receive data from the sensors 136/138/140, such as torque and angle values. From that data, the processor/controller 126 may determine various information, such as the duration of the torque applied, or should be applied, to a work piece.

The sensor data and information can be logged in real time or at a predetermined sampling rate and stored in the memory 128 and/or storage 130. The sensor data and information may also be transmitted to the external device via a communication link 148 (which may include an antenna) for further analysis and review. For example, the communication link 148 may use a protocol such as Wi-Fi Direct, or a personal area network (PAN) protocol such as Bluetooth, Bluetooth Smart (also known as Bluetooth low energy), wireless USB, or ZigBee (IEEE 802.15.4). The communication link 148 may be a wireless local area network (WLAN) link such as a flavor of Wi-Fi, or a cellular communications data protocol associated with mobile broadband, LTE, GSM, CDMA, WiMAX, High Speed Packet Access (HSPA), Universal Mobile Telecommunications System (UMTS), etc.

"Data" is/are values that are processed to make them meaningful or useful "information." However, as used herein, the terms data and information should be interpreted to be interchangeable, with data including information and information including data. For example, where data is stored, transmitted, received, or output, that may include data, information, or a combination thereof.

The radio transceiver 132 comprises a transmitter, a receiver, and associated encoders, modulators, demodulators, and decoders. The transceiver 132 manages the radio communication links, establishing the communications link 148 with the external device via one-or-more antennas embedded in the tool 100, enabling bidirectional communication between the processor/controller 126 and the external device. The communications link 148 may be a direct link between the tool 100 and the external device, or may be an indirect link through one-or-more intermediate components, such as via a Wi-Fi router or mesh connection (not illustrated).

The tool 100 also includes a power source 150 to power the processor/controller 126, the bus 134, and other electronic components. For example, the power source 150 may be one-or-more batteries arranged in the body 102. However, the power source 150 is not limited to batteries, and other technologies may be used such as fuel cells. The tool 100 may also include components to recharge the power source 150, such as organic or polymer photovoltaic cells arranged along the tool 100, and/or an interface by which to receive an external charge, such as a Universal Serial Bus (USB) port or an inductive pick-up, along with associated charging-control electronics.

The display 118 may be used by software/firmware executed by the processor/controller 126 to display information for the user to view and interpret. Such information may be formatted as text, graphics, or a combination thereof. The display 118 may also be used to provide feedback when information is entered into tool 100 (for example, via the buttons 116 and/or a touch-sensitive interface integrated with the display 118 itself). The display 118 may be a liquid crystal display (LCD) display, an organic light emitting diode (OLED) display, an electronic paper display, or any kind of black-and-white or color display that has suitable power-consumption requirements and volume to facilitate integration into the tool 100.

The tool 100 may be configured for substantially simultaneous measurement of torque and angle target amounts. The tool 100 may be configured with minimum and maximum target torque values and minimum and maximum target angle values. When applying torque, the tool 100 may indicate when the target torque value has been reached. Simultaneously, the tool may measure the angular rotation or the tool 100 and indicate a failed torqueing operation if the target torque value is reached before the minimum target angle value has been reached. If either of the maximum target torque or angle values are exceeded the tool 100 may indicate a failed operation.

Figure 5:
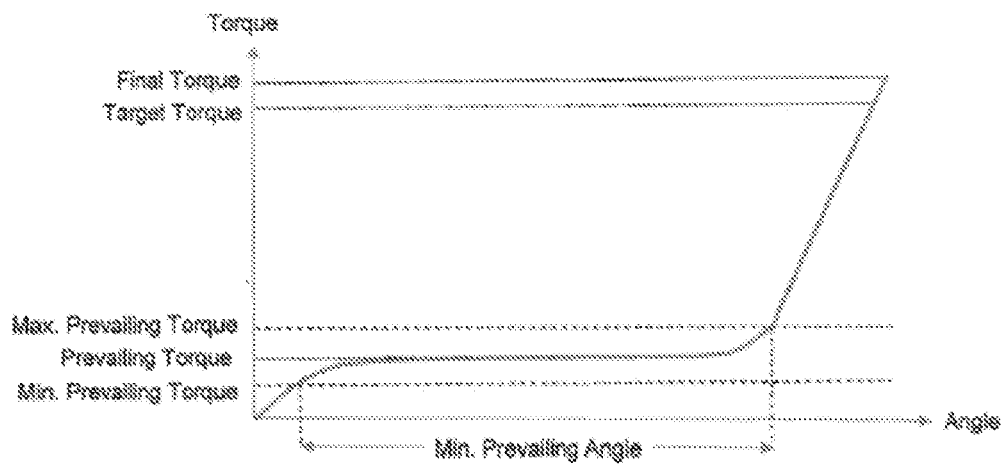
FIG. 5 illustrates a graph of torque measurement according to an embodiment of the present invention.

Further, the tool 100 may also measure prevailing torque for locking type fasteners and compensate the target torque value by adding the prevailing torque value to determine automatically a final target torque value. FIG. 5 illustrates a graph of an example prevailing torque measurement. The tool 100 may be configured with a minimum starting prevailing torque value, a maximum ending prevailing torque value, the minimum prevailing angle value and the target torque value.

When the measured amount of torque applied to the work piece reaches the minimum prevailing torque value, the angle measurement may begin. The applied torque and angle may be measured until the maximum prevailing torque value is reached. The measured angular rotation applied to the work piece, between minimum and maximum prevailing torque values, may be compared to the minimum prevailing angle value to determine if the required amount of angular rotation occurred for measuring the prevailing torque value. The prevailing torque value may be calculated from the center section of sampled torque readings between the minimum and maximum prevailing torque values. The prevailing torque value may be automatically added to the target torque value to determine the final torque value used for positive indication of target value reached. The tool 100 may be configured with a minimum and maximum torque tolerance and a maximum angle for additional checks, such as over torque and over rotation following the maximum prevailing torque point for reporting a failed torque cycle.

Figure 6:
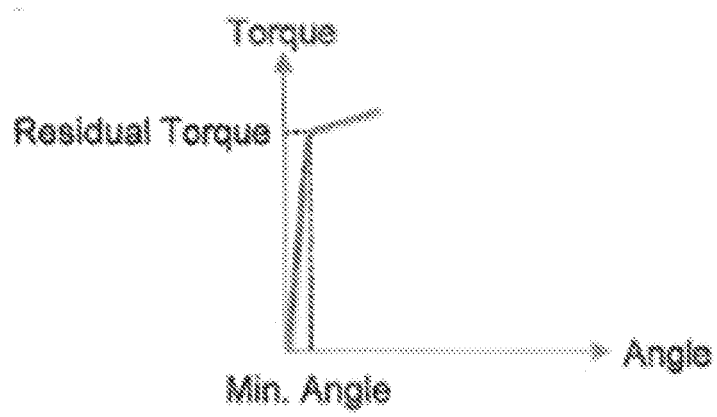
FIG. 6 illustrates a graph of residual torque measurement according to an embodiment of the present invention.

The tool 100 may also measure the residual torque of an already tightened fastener. FIG. 6 depicts an illustrative graph of a residual torque measurement. The tool 100 may be configured to record the amount of torque where the work piece begins to rotate. The tool 100 may also be configured with a minimum angle value before the residual torque measurement is to begin.

Figure 7:
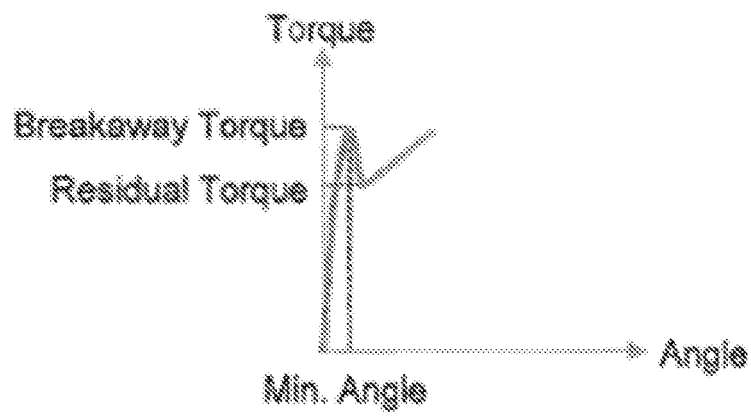
FIG. 7 illustrates a graph of breakaway/residual torque measurement according to an embodiment of the present invention.

The tool 100 may be configured for reporting a difference in breakaway torque and residual torque where a higher peak torque is required to overcome thread locking or corrosion. An illustrative graph of a breakaway/residual torque measurement is depicted in FIG. 7. A drop in torque value followed by rising torque may be reported as the peak breakaway torque and the minimum residual torque.

Figure 8:
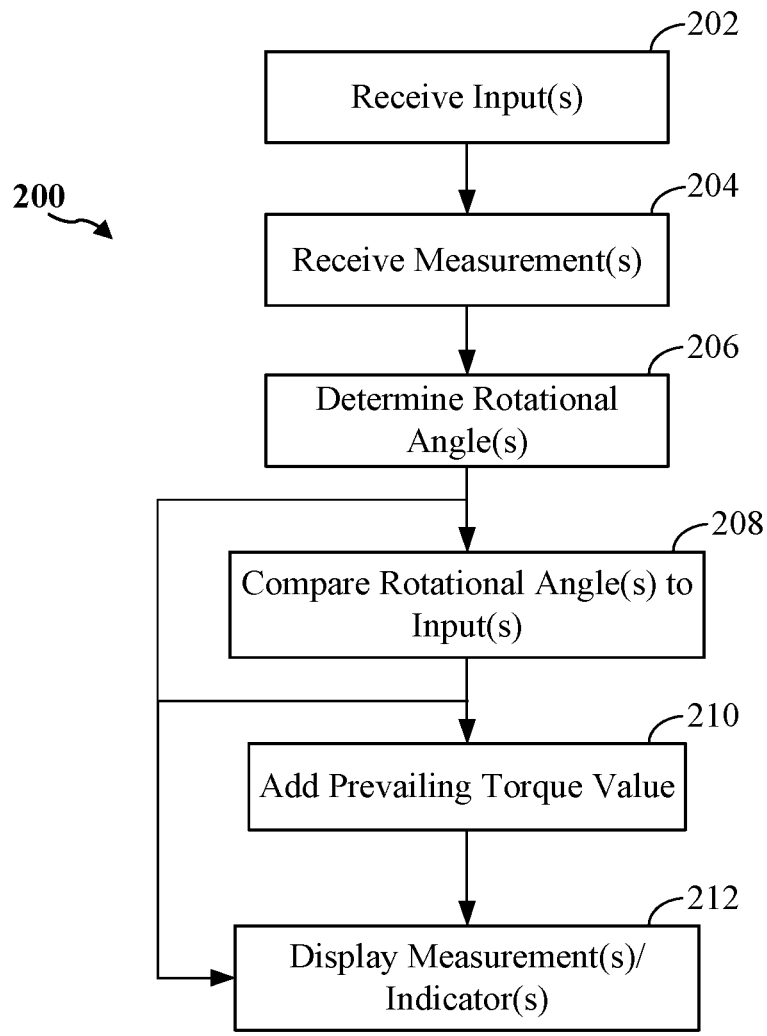
FIG. 8 is another exemplary process flow diagram illustrating operations of measuring torque and angle according to an embodiment of the present invention.

Referring to FIG. 8, a flow diagram of steps of an illustrative method 200 of measuring torque and rotational angle values is shown. As shown in block 202, one or more inputs as described herein may be input into the input interface of the tool 100. The input may include, without limitation, one or more of a target torque value, a target rotational angle value, a minimum torque value, a maximum torque value, a minimum rotational angle value, and a maximum rotational angle value. The inputs may be stored in the memory 128 and/or storage 130 (illustrated in FIG. 4). As shown in block 204, one or more measurements may be received, as described herein. As the tool 100 is operated against or on a work piecework piece, one or more sensors may detect and report a measurement. The sensors may include the torque sensor 136 configured to detect and report a torque value applied to the work piecework piece and/or angle sensor 138 (which may include a gyroscope) configured to detect and report an angular velocity of the drive 108. The measurements may be stored in the memory 128 and/or storage 130, as described herein.

As shown in block 206, one or more rotational angle values or positions may be determined. The processor/controller 126 may determine the rotational angle value(s) based on the angular velocity received from the angle sensor 138. The processor/controller 126 may be also be a part of the angle sensor 138, by which the rotational angle values may be communicated to 128 and/or storage 130 from the angle sensor 138. The measured torque amounts, as described herein, may be determined to be residual torque values, breakaway torque values or a difference between the two. For example, as shown in block 212, the received measurements may be displayed substantially contemporaneously with the receipt of the measurement. Displaying the measurements in such a manner may allow the user to monitor the applied torque value (or rotational angle value) to the work piecework piece as the tool 100 is operated.

As shown in block 208, the rotational angle values determined using the data from the angle sensor 138 may be compared to one or more of the inputs to determine if the tool 100 is properly operating. For example, if a torque value is input, the tool, through the processor/controller 126, may calculate the appropriate angular position of the drive 108 to accomplish the target torque input. The appropriate angular position may be compared to the actual angular position. An error or other indication may be output and displayed on the display 118 (block 212) to indicate a discrepancy between the measured or applied values and the expected values.

The measured or applied torque amounts may also include a prevailing torque value. As shown in block 210, and described, the prevailing torque value may be automatically added to a target torque value to determine a final torque value used for positive indication that the appropriate torque has been achieved by the tool operation.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool adapted to apply torque to a work piece, comprising:
    a torque sensor adapted to measure an amount of torque applied to the work piece;
    a gyroscope adapted to measure an amount of angular rotation applied to the work piece; and
    a controller configured with minimum and maximum prevailing torque values and a minimum prevailing angle value, the controller adapted to:
        cause the gyroscope to measure the amount of angular rotation applied to the work piece from when the amount of torque substantially meets the minimum prevailing torque value until the amount of torque substantially meets the maximum prevailing torque value, thereby creating an angular measurement;
        determine a measured prevailing torque value when the angular measurement substantially meets the minimum prevailing angle value; and
        determine a final target torque value based on the measured prevailing torque value.

2. The tool of claim 1, wherein the controller is further configured with a target torque value and the controller is adapted to determine the final target torque value by adding the measured prevailing torque value to the target torque value.

3. The tool of claim 1, wherein the controller is further adapted to cause an indication when the amount of torque applied to the work piece substantially meets the final target torque value.

4. The tool of claim 1, further comprising a display configured to display the final target torque value.

5. The tool of claim 1, further comprising a display configured to display the measured prevailing torque value.

6. The tool of claim 1, further comprising a drive portion including a receiving area for a receiving a tool bit.

7. A method of measuring torque applied to a work piece by a tool having a controller, a torque sensor, a gyroscope, and a display, the method comprising:
    configuring the controller with minimum and maximum prevailing torque values and a minimum prevailing angle value;
    measuring, via the torque sensor, an amount of torque applied to the work piece;
    measuring, via the gyroscope, an amount of angular rotation applied to the work piece from when the amount of torque substantially meets the minimum prevailing torque value until the amount of torque substantially meets the maximum prevailing torque value, thereby creating an angular measurement;
    determining a measured prevailing torque value when the angular measurement substantially meets the minimum prevailing angle value; and
    determining a final target torque value based on the measured prevailing torque value.

8. The method of claim 7, further comprising:
    configuring the controller with a target torque value; and
    wherein determining the final target torque value includes adding the measured prevailing torque value to the target torque value.

9. The method of claim 7, further comprising causing an indication when the amount of torque applied to the work piece substantially meets the final target torque value.

10. The method of claim 7, further comprising displaying, via the display, the final target torque value.

11. The method of claim 7, further comprising displaying, via the display, the measured prevailing torque value.

* * * * *